(12) United States Patent
Chiang et al.

(10) Patent No.: US 8,475,913 B2
(45) Date of Patent: Jul. 2, 2013

(54) TITANIUM/TITANIUM ALLOY-AND-RESIN COMPOSITE AND METHOD FOR MAKING THE SAME

(75) Inventors: Huann-Wu Chiang, New Taipei (TW); Cheng-Shi Chen, New Taipei (TW); Dai-Yu Sun, Shenzhen (CN); Yuan-Yuan Feng, Shenzhen (CN); Yu-Qiang Wang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/293,507

(22) Filed: Nov. 10, 2011

(65) Prior Publication Data

US 2012/0301690 A1    Nov. 29, 2012

(30) Foreign Application Priority Data

May 24, 2011    (CN) .............................. 201110135328

(51) Int. Cl.
| | |
|---|---|
| *B32B 7/00* | (2006.01) |
| *B32B 3/00* | (2006.01) |
| *B32B 3/26* | (2006.01) |
| *C25D 5/00* | (2006.01) |
| *C23C 28/00* | (2006.01) |

(52) U.S. Cl.
USPC ........ 428/213; 428/212; 428/315.9; 428/214; 205/200; 205/171

(58) Field of Classification Search
None
See application file for complete search history.

(56) References Cited

U.S. PATENT DOCUMENTS

| 8,309,113 B2* | 11/2012 | Hofmann et al. ............ 424/423 |
| 2006/0147634 A1* | 7/2006 | Strauss ......................... 427/299 |
| 2009/0082865 A1* | 3/2009 | Raja et al. ................. 623/16.11 |
| 2010/0116669 A1* | 5/2010 | Strauss ........................... 205/50 |
| 2010/0320089 A1* | 12/2010 | Misra et al. ................... 205/109 |
| 2012/0301704 A1* | 11/2012 | Chen et al. ................. 428/315.9 |

* cited by examiner

Primary Examiner — David Sample
Assistant Examiner — Nicole T Gugliotta
(74) Attorney, Agent, or Firm — Altis Law Group, Inc.

(57) ABSTRACT

A titanium/titanium alloy-and-resin composite includes a titanium/titanium alloy substrate, a nano-porous oxide film formed on the substrate, and resin compositions coupled to the surface of the nano-porous oxide film. The nano-porous oxide film has nano pores and includes at least two layers of different three dimensional meshed structures. The resin compositions contain crystalline thermoplastic synthetic resins. A method for making the titanium/titanium alloy-and-resin composite is also described.

9 Claims, 4 Drawing Sheets

TITANIUM/TITANIUM ALLOY-AND-RESIN COMPOSITE AND METHOD FOR MAKING THE SAME

CROSS-REFERENCE TO RELATED APPLICATIONS

This application is one of the two related co-pending U.S. patent applications listed below. All listed applications have the same assignee. The disclosure of each of the listed applications is incorporated by reference into another listed application.

| Attorney Docket No. | Title | Inventors |
|---|---|---|
| US 39535 | TITANIUM/TITANIUM ALLOY-AND-RESIN COMPOSITE AND METHOD FOR MAKING THE SAME | HUANN-WU CHIANG et al. |
| US 39536 | TITANIUM/TITANIUM ALLOY-AND-RESIN COMPOSITE AND METHOD FOR MAKING THE SAME | CHENG-SHI CHENN et al. |

BACKGROUND

1. Technical Field

The present disclosure relates to titanium/titanium alloy-and-resin composites, particularly to a titanium/titanium alloy-and-resin composite having high bonding strength between titanium/titanium alloy and resin and a method for making the composite.

2. Description of Related Art

Adhesives, for combining heterogeneous materials in the form of a metal and a synthetic resin are in demand in a wide variety of technical fields and industries, such as the automotive and household appliance fields. However, the bonding strength of the metal and resin is weak. Furthermore, adhesives are generally only effective in a narrow temperature range of about −50° C. to about 100° C., which means they are not suitable in applications where operating or environmental temperatures may fall outside the range. Due to the above reason, other bonding methods have been applied that do not involve the use of an adhesive. One example of such methods is by forming bonds through injection molding or other similar process. However, the bonding strength of the metal and resin can be further improved.

Therefore, there is room for improvement within the art.

BRIEF DESCRIPTION OF THE FIGURES

Many aspects of the disclosure can be better understood with reference to the following figures. The components in the figures are not necessarily drawn to scale, the emphasis instead being placed upon clearly illustrating the principles of the disclosure. Moreover, in the drawings like reference numerals designate corresponding parts throughout the several views.

DETAILED DESCRIPTION

Figure 1:
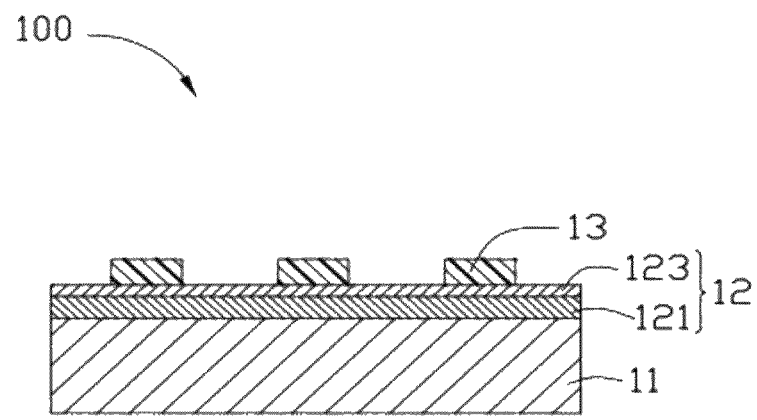
FIG. 1 is a cross-sectional view of an exemplary embodiment of a titanium/titanium alloy-and-resin composite.

FIG. 1 shows a titanium/titanium alloy-and-resin composite 100 according to an exemplary embodiment. The titanium/titanium alloy-and-resin composite 100 includes a titanium/titanium alloy substrate 11, a nano-porous oxide film 12 formed on the substrate 11, and resin compositions 13 formed on the nano-porous oxide film 12.

The nano-porous oxide film 12 is titanium dioxide film. In this embodiment, the nano-porous oxide film 12 is formed by electrochemical treating the substrate 11 first, and then anodizing the substrate 11.

Figure 2:
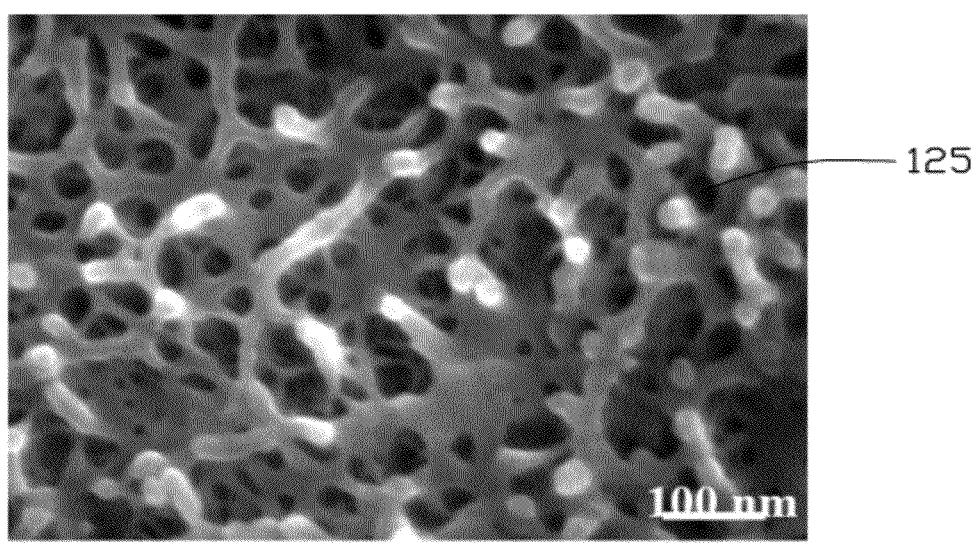
FIG. 2 is a scanning electron microscopy view of an exemplary embodiment of a titanium/titanium alloy substrate being anodized.

Referring to FIG. 2, the nano-porous oxide film 12 defines nano-pores 125. Referring also to FIG. 1, the nano-porous oxide film 12 includes at least two layers of different three-dimensional meshed structures. The two layers are inner layer 121 near to the substrate 11 and surface layer 123 far from the substrate 11. The nano-porous oxide film 12 has a total thickness of about 300 nm-500 nm, and the surface layer 123 has a thickness of about 80 nm-120 nm. The nano-pores of the inner layer 121 and the nano-pores of the surface layer 123 have different pore diameters. The pore diameter of the nano-pores of the inner layer 121 may be at a range of about 20 nm-50 nm. The pore diameter of the nano-pores of the surface layer 123 may be at a range of about 100 nm-150 nm.

The resin compositions 13 may be coupled to the surface of the nano-porous oxide film 12 by molding. During the molding process, molten resin coats the surface of the nano-porous oxide film 12 and fills the nano-pores 125, thus strongly bonding the resin compositions 13 to the nano-porous oxide film 12 and the substrate 11. Compared to the conventional injection molding process in which the titanium/titanium alloy substrate is not electrochemically treated and anodized, the composite 100 in this exemplary embodiment has a much stronger bond between the resin compositions 13 and the substrate 11 (about quintuple the bonding force). The resin compositions 13 may be made up of crystalline thermoplastic synthetic resins having high fluidity. In this exemplary embodiment, polyphenylene sulfide (PPS) and polyamide (PA) can be selected as the molding materials for the resin compositions 13. These resin compositions 13 can bond firmly with the nano-porous oxide film 12 and the substrate 11.

It is to be understood that auxiliary components may be added to the resins to modify properties of the resin compositions 13, for example, fiberglass may be added to PPS. The fiberglass may have a mass percentage of about 30% with regard to the PPS and the fiberglass.

A method for making the composite 100 may include the following steps:

The titanium/titanium alloy substrate 11 is provided.

The substrate 11 is ultrasonic cleaned using anhydrous ethanol and acetone respectively, and then rinsed.

The substrate 11 is electrochemically treated. The electrochemical treating process may be carried out in an acid water solution containing sulfuric acid, or an acid water solution of sulfuric acid, with the substrate 11 being a cathode, and a stainless steel board being an anode. The sulfuric acid may have a molar concentration of about 0.5 mol/L-2 mol/L. The electric current density through the acid water solution is about 0.1 ampere per square decimeter ($A/dm^2$)-5 $A/dm^2$. Electrochemical treating the substrate 11 may last for about 1 minute-10 minutes. Once electrochemically treated, a titanium hydride ($TiH_2$) layer 14 is formed on the substrate 11

Figure 3:
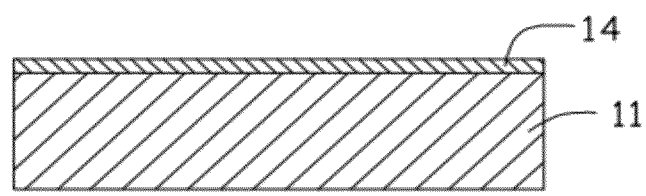
FIG. 3 is a cross-sectional view of an exemplary embodiment of a titanium/titanium alloy substrate being electrochemically treated.

(referring to FIG. 3). The titanium hydride layer 14 has a thickness of about 80 nm-120 nm, and a surface roughness (Ra) of about 0.3 μm-0.5 μm. Next, the substrate 11 having the titanium hydride layer 14 is rinsed in water and then dried.

The substrate 11 having the titanium hydride layer 14 is anodized to form the nano-porous oxide film 12. The anodizing process may be carried out in an alkaline water solution containing sodium hydroxide (NaOH), or an alkaline water solution of sodium hydroxide, with the substrate 11 being an anode, and a stainless steel board being a cathode. The sodium hydroxide may have a molar concentration of about 4.5 mol/L-5.5 mol/L. The electric current density through the alkaline water solution is about 1-30 A/dm$^2$. Anodizing the substrate 11 may last for about 1 minute-10 minutes. Once anodized, the nano-porous oxide film 12 is formed on the substrate 11. Next, the substrate 11 having the nano-porous oxide film 12 is rinsed in water and then dried.

During the anodizing process, the titanium hydride layer 14 is first converted to titanium dioxide and forms the surface layer 123 of the nano-porous oxide film 12. When the titanium hydride layer 14 is completely converted to titanium dioxide, the anodizing process is continued on the substrate 11 and forms the inner layer 121 of the nano-porous oxide film 12.

In the exemplary embodiment, the electrochemical treating process and the anodizing process are all carried out at a room temperature, that is, the acid and the alkaline water solutions are not heated.

The thickness of the titanium hydride layer 14 in this embodiment is only an example. The thickness of the titanium hydride layer 14 can be changed by adjusting the concentration of the acid water solution, the electric current density, and the lasting time of the electrochemical treating process.

The structure and relative characters of the nano-porous oxide film 12 in this embodiment is only an example. The structure and the characters of the nano-porous oxide film 12 can be changed by adjusting the concentration of the alkaline water solution, the electric current density, and the lasting time of the anodizing process.

The thicknesses of the inner layer 121 and the surface layer 123 of the nano-porous oxide film 12, and the pore diameter of the nano pores 125 can be changed by adjusting the parameters of the electrochemical treating process and the anodizing process. Furthermore, by adjusting the treatment parameters, a nano-porous oxide film having more than two layers of different three dimensional meshed structures can also obtain.

Figure 4:
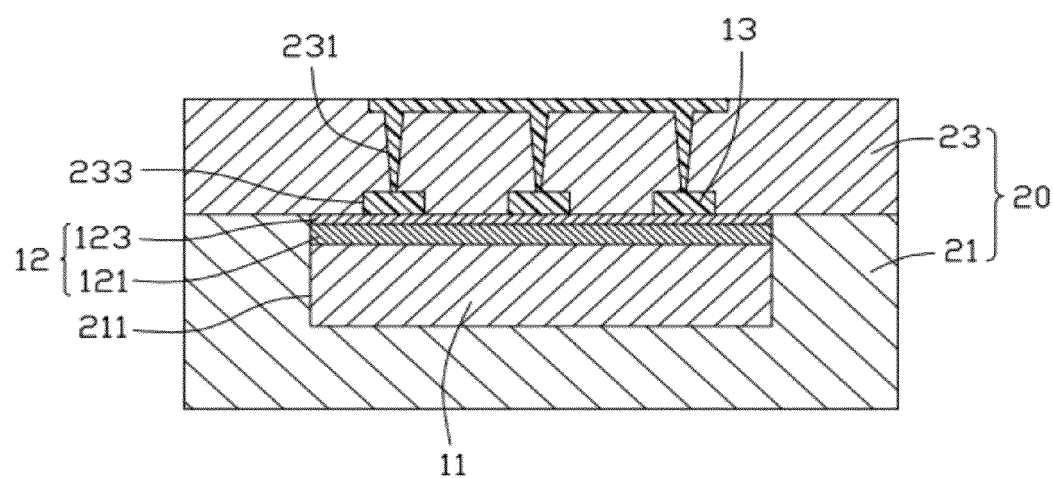
FIG. 4 is a cross-sectional view of a mold of the composite shown in FIG. 1.

Referring to FIG. 4, an injection mold 20 is provided. The injection mold 20 includes a core insert 23 and a cavity insert 21. The core insert 23 defines several gates 231, and several first cavities 233. The cavity insert 21 defines a second cavity 211 for receiving the substrate 11. The substrate 11 having the nano-porous oxide film 12 is located in the second cavity 211, and molten resin is injected through the gates 231 to coat the surface of the nano-porous oxide film 12 and fill the nano-pores 125, and finally fill the first cavities 233 to form the resin compositions 13, as such, the composite 100 is formed. The molten resin may be crystalline thermoplastic synthetic resins having high fluidity, such as PPS, or PA.

The shear strength of the composite 100 has been tested. The tests indicated that the shear strength of the composite 100 was 19 MPa-27 MPa. Furthermore, the composite 100 has been subjected to a temperature humidity bias test (72 hours, 85° C., relative humidity: 85%) and a thermal shock test (48 hours, −40° C.-85° C., 4 hours/cycle, 12 cycles total), such testing did not result in decreased shear strength of the composite 100.

It is believed that the exemplary embodiment and its advantages will be understood from the foregoing description, and it will be apparent that various changes may be made thereto without departing from the spirit and scope of the disclosure or sacrificing all of its advantages, the examples hereinbefore described merely being preferred or exemplary embodiment of the disclosure.

What is claimed is:

1. A titanium or titanium alloy-and-resin composite, comprising:
   a titanium or titanium alloy substrate;
   a nano-porous oxide film formed on the substrate, the nano-porous oxide film having nano pores and comprising at least two layers of different porosity or pore diameters; and
   at least a resin composition integrally coupled to the surface of the nano-porous oxide film, the resin composition containing crystalline thermoplastic synthetic resins.

2. The composite as claimed in claim 1, wherein the nano-porous oxide film is titanium dioxide film.

3. The composite as claimed in claim 1, wherein the at least two layers comprising an inner layer near to the substrate and a surface layer far from the substrate, the inner layer has nano pores having a pore diameter at a range of about 20 nm-50 nm, the surface layer has nano pores having a pore diameter at a range of about 100 nm-150 nm.

4. The composite as claimed in claim 3, wherein the nano-porous oxide film has a total thickness of about 300 nm-500 nm, the surface layer has a thickness of about 80 nm-120 nm.

5. The composite as claimed in claim 3, wherein the resin composition fills the nano-pores of the inner layer and the surface layer.

6. The composite as claimed in claim 1, wherein the resin composition is molded crystalline thermoplastic synthetic resin composition.

7. The composite as claimed in claim 1, wherein the crystalline thermoplastic synthetic resin is polyphenylene sulfide or polyamide.

8. The composite as claimed in claim 1, wherein the crystalline thermoplastic synthetic resin is polyphenylene sulfide added with fiberglass, the fiberglass has a mass percentage of about 30% with regard to the polyphenylene sulfide and the fiberglass.

9. A titanium or titanium alloy-and-resin composite, comprising:
   a titanium or titanium alloy substrate;
   a nano-porous oxide film formed on the substrate, the nano-porous oxide film having nano pores and comprising at least two layers of different porosity or pore diameters; and
   at least a resin composition integrally molded to the surface of the nano-porous oxide film, the resin composition containing crystalline thermoplastic synthetic resins.

* * * * *